United States Patent

Stelts

Patent Number: 5,275,488
Date of Patent: Jan. 4, 1994

[54] BOF DROP-IN THERMOCOUPLE

[75] Inventor: Philip D. Stelts, Center Valley, Pa.

[73] Assignee: Bethlehem Steel Corporation, Bethlehem, Pa.

[21] Appl. No.: 68,002

[22] Filed: May 27, 1993

[51] Int. Cl.5 .......................... G01K 1/10; G01K 1/12
[52] U.S. Cl. ........................................ 374/140; 266/88; 136/234; 374/208
[58] Field of Search .................. 374/140, 208; 266/88, 266/95; 136/234, 230, 232, 233

[56] References Cited

U.S. PATENT DOCUMENTS

| | | |
|---|---|---|
| 2,271,254 | 1/1942 | Witt . |
| 2,585,404 | 2/1952 | Pierce . |
| 3,038,951 | 6/1962 | Mead . |
| 3,275,479 | 9/1966 | Binkowski ............................ 136/233 |
| 3,288,654 | 11/1966 | Perrin et al. ......................... 374/140 |
| 3,347,099 | 10/1967 | Schraeder ............................ 374/140 |
| 3,374,122 | 3/1968 | Cole ..................................... 136/234 |
| 3,463,005 | 8/1969 | Hance . |
| 3,493,439 | 2/1970 | Boyle ................................... 136/234 |
| 3,501,957 | 3/1970 | Jones ................................... 136/234 |
| 3,505,871 | 4/1970 | Kern et al. . |
| 3,531,331 | 9/1970 | Davies ................................. 136/234 |
| 3,574,598 | 4/1971 | Kern et al. . |
| 3,597,975 | 8/1971 | Kern et al. . |
| 3,643,509 | 2/1972 | Surinx ................................. 374/140 |
| 3,672,222 | 6/1972 | Stelts et al. ......................... 374/140 |
| 3,685,359 | 8/1972 | Boron et al. ........................ 374/140 |
| 3,915,002 | 10/1975 | Hance et al. ........................ 136/230 |
| 3,922,916 | 12/1975 | Wickert ............................... 374/140 |
| 3,950,992 | 4/1976 | Hance ................................. 374/140 |
| 4,871,263 | 10/1989 | Wilson ................................ 374/140 |
| 4,881,824 | 11/1989 | Falk et al. ........................... 374/140 |
| 4,964,736 | 10/1990 | Cure et al. .......................... 374/140 |
| 4,975,123 | 12/1990 | Gray ................................... 136/230 |

FOREIGN PATENT DOCUMENTS

| | | | |
|---|---|---|---|
| 2207307 | 8/1973 | Fed. Rep. of Germany ...... 374/140 |
| 2218642 | 11/1973 | Fed. Rep. of Germany ...... 374/140 |
| 0883629 | 12/1961 | United Kingdom ............... 136/234 |

Primary Examiner—William A. Cuchlinski, Jr.
Assistant Examiner—Diego F. F. Gutierrez

[57] ABSTRACT

A BOF drop-in sensor assembly includes a handle, a weight, a sensor, and a cage to protect the sensor. The weight includes a high density material having a density of at least 1.2 times the density of steel. The cage comprises crossed rods which are easily melted and which allow molten steel to quickly envelop the sensor providing a highly reliable and accurate reading.

19 Claims, 2 Drawing Sheets

BOF DROP-IN THERMOCOUPLE

BACKGROUND OF THE INVENTION

The present invention relates to measurement devices utilized in the basic oxygen process of manufacturing steel. In particular, the present invention is directed to an immersible expendable drop-in thermocouple for measuring melt temperatures in a basic oxygen furnace.

BACKGROUND OF THE INVENTION

An important control in the manufacture of steel in basic oxygen furnaces (BOF) is the measurement of the temperature of the molten steel or melt during or after the oxygen blow. Melt temperature readings are directly correlated to carbon content of the bath and, when accurate and reliable, can significantly reduce production time and cost. Problems associated with obtaining such measurements include penetration of the slag layer, immersion of the temperature probe to a sufficient depth for accurate measurement, and design of a system which will stand up to melt temperatures and conditions for a time suitable to obtain the measurements.

Several devices have been proposed including motorized lances and free falling weighted bombs. While motorized lances provide reliable BOF measurements, they are very expensive. Weighted bombs provide low cost, reliable measurement systems, however, difficulties exist in designing a system having sufficient density to overcome the buoyant effect of the molten steel.

Typical weighted bombs include structure to protect electrical leads, a sensor, a weight to overcome the buoyancy of molten steel and fingers or legs partially surrounding the sensor to provide some protection to the sensor. However, the design of these bombs do not address the concern for materials compatibility and the competing concerns of protecting the sensor while allowing the sensor to be enveloped by the molten steel.

The present invention provides a low-cost, expendable drop-in sensor which provides a high degree of protection for the sensor while allowing the molten steel to fully and quickly envelop the sensor to develop a reliable and accurate reading.

SUMMARY OF THE INVENTION

Generally, this invention fulfills the above-described needs in the art by providing a drop-in sensor comprising a handle having an end, a sensor secured to and extending from the end, a first sealing member secured to and surrounding the handle adjacent the end, a second sealing member secured to and surrounding the handle axially spaced from the first sealing member, a tube surrounding the handle and extending between and secured to the first and second sealing members and defining a receptacle, a high density material within the receptacle, and a cage operably associated with the tube and disposed about the sensor.

In preferred embodiments of the present invention, the high density material has a bulk density of at least 1.2 times the density of liquid steel. Bulk density is used herein to mean the overall density, including both the high density material and any voids contained within it.

In preferred embodiments of the present invention, the handle is comprised of a first pipe secured within a second pipe to minimize void spaces between the pipes. Preferred embodiments of this invention also include a vented receptacle and a cage comprised of first and second mutually perpendicular rods.

These and other features and advantages of the invention will be readily apparent in view of the following drawings and description of the above-described invention.

BRIEF DESCRIPTION OF THE DRAWINGS

The above and other advantages and novel features of the present invention will become apparent from the following detailed description of the preferred embodiment of the invention illustrated in the accompanying drawings, wherein.

DESCRIPTION OF THE INVENTION

Figure 1:
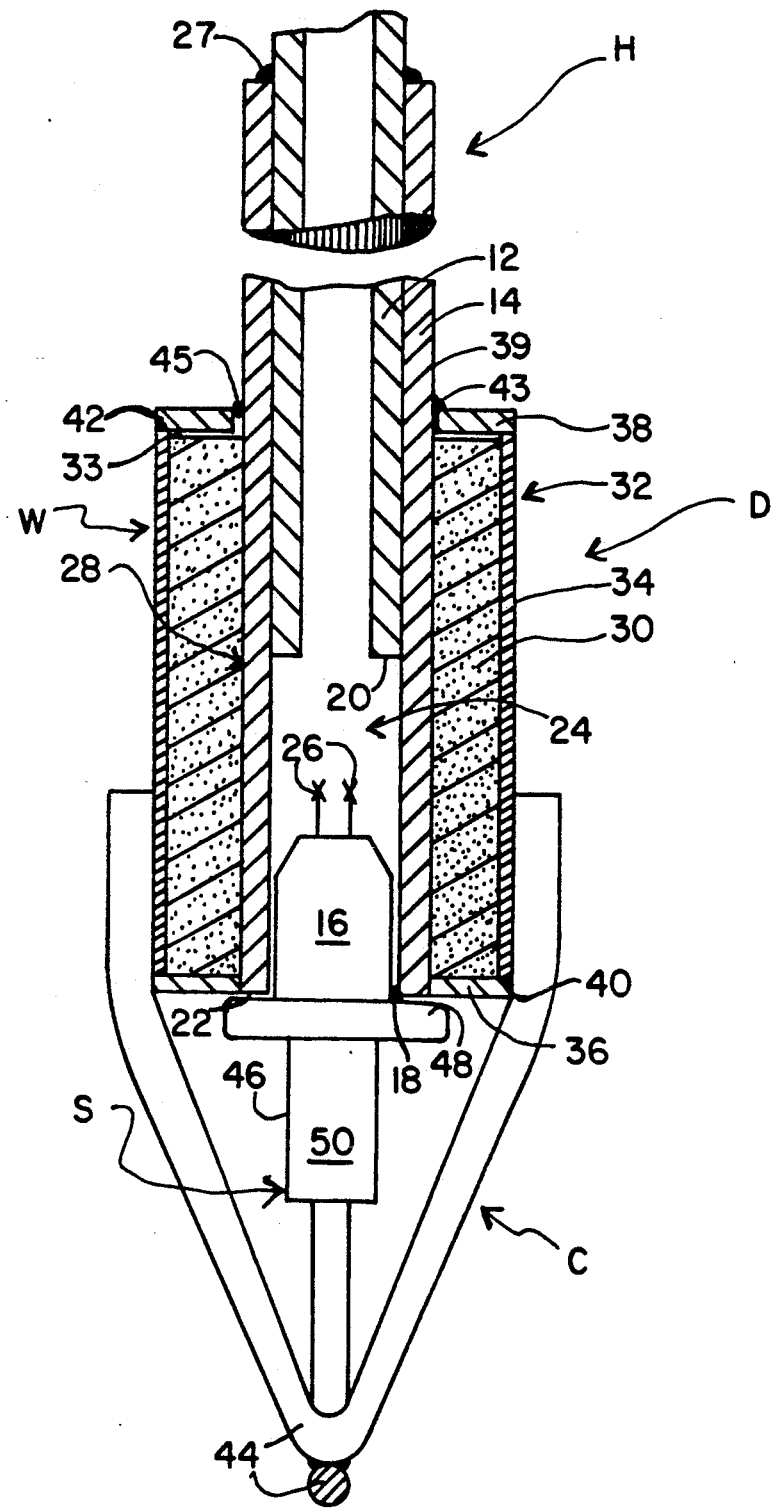
FIG. 1 is a fragmentary partial cross-sectional view and partial elevation of the sensor assembly of the present invention.

A low cost, high accuracy BOF drop-in sensor assembly D of the present invention is best shown in FIG. 1. Drop-in sensor assembly D includes handle H, weight W, cage C and sensor S.

Handle H includes first pipe 12 secured within second pipe 14. Pipe 14 is preferably a ⅜ inch schedule 80 steel pipe. The inner diameter of pipe 14 is sized to accommodate end portion 16 of sensor S, such as Electro-Nite 6/30 thermocouple sensor, with a minimum amount of void space 18. Pipe 12, preferably a ⅜ inch schedule 80 steel pipe is slid or pressed into pipe 14 and secured therein. Pipes 12 and 14 are chosen to minimize any void spaces between them. Pipe 12 terminates at end 20 short of end 22 of pipe 14, leaving cavity 24. The size of cavity 24 is minimized, as are all void spaces in drop-in sensor assembly D, but is large enough to accommodate end portion 16 of sensor S and the connections between sensor leads 26 and the electrical cable, not shown in the figures, leading through handle H to the recording equipment. Pipes 12 and 14 are secured, as by welding, at weld 27 opposite ends 20 and 22. Use of two pipes 12 and 14 provides protection to the electrical cable from the molten steel and also minimizes the amount of void space in handle H.

Surrounding end 28 of handle H is weight W. Weight W is positioned close to sensor S to ensure that sensor S will be submerged in the molten steel. Weight W includes high density material 30 contained within receptacle 32. High density material 30 has a density greater than that of molten steel. In testing, it has been found that high density material 30 should have a density sufficient that the bulk density of weight W is at least 1.2 times the density of molten steel to ensure immersion of drop-in sensor assembly D to a depth sufficient to obtain an accurate reading. Bulk density is used herein to mean the overall density, including both high density material 30 and any voids contained within it. Suitable materials for high density material 30 include lead and copper. Material 30 is introduced into receptacle 32 in a molten state to fill receptacle 30 as completely as possible and leave the fewest voids as possible. Lead is a particularly preferred material because of its high density, low cost and low shrinkage upon solidification. Low solidification shrinkage helps minimize void spaces in receptacle 32, such as void 33, as best shown in FIG. 1.

Receptacle 32 includes tube 34 and washers 36 and 38. Washers 36 and 38 extend transversely outward of pipe 14 from outer surface 39 of pipe 14 to ends 40 and 42 of tube 34. In preferred embodiments of the invention, tube 34 is a steel tube having dimensions of 2 inch O.D.×0.065 inch wall×3 inch long and washers 36 and 38 are SAE flat steel washers having 2 inch O.D., 1 1/16″ I.D. and a thickness of 9/64 inch. Chamber 32 as thus described will hold approximately 2.3 pounds of lead.

Washer 36 is secured, as by welding, about the circumference of pipe 14 adjacent end face 22, in a leak tight seal. Washer 36 is similarly secured to end face 40 of tube 34 in a leak tight seal. A leak tight seal is desired to prevent leakage of material 30 when poured into receptacle 32.

Washer 38 is axially spaced from washer 36 the length of tube 34. Washer 38 is secured to pipe 14 and to end face 42 of tube 34 in a manner, such as by tack welding 43, to create circumferentially spaced vents 45 while securing washer 38 to pipe 14. Washer 38 prevents material 30 from boiling off before the reading is completed. However, because lead is molten at the temperature of molten steel, vented seals 45 are desired to prevent a pressure build-up due to boiling while drop-in sensor assembly D is immersed in the bath of molten steel. Vented seals prevent a catastrophic failure of drop-in sensor assembly D on account of pressure and/or volume changes, because the melting point of steel, usually in excess of 1500° C., is well above the melting point of lead, 327° C., and close to its boiling point of 1740° C.

Figure 2:
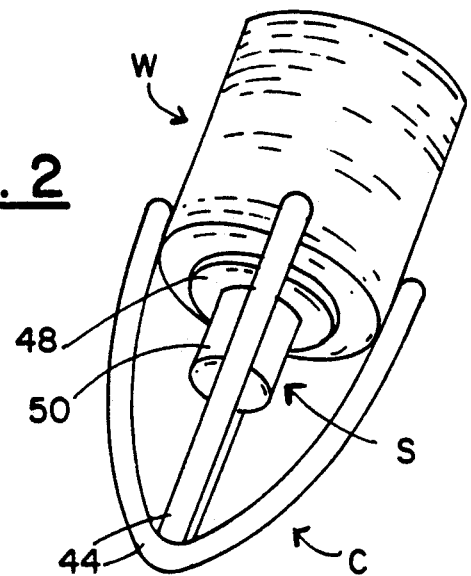
FIG. 2 is a fragmentary bottom perspective view of the sensor assembly of the present invention.
Figure 3:
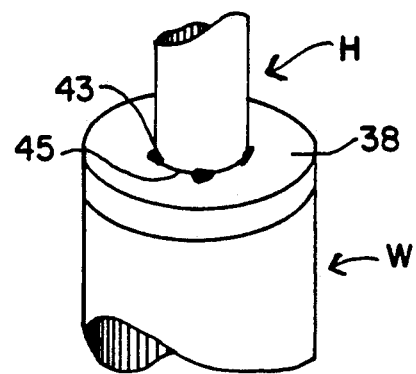
FIG. 3 is a fragmentary top perspective view of the sensor assembly of the present invention.

As best shown in FIG. 2, cage C includes two ¼ inch diameter solid steel rods 44. Rods 44 surround sensor S to provide protection to sensor S while the slag layer is being penetrated. Particular attention has been paid to allowing molten steel to permeate through cage C and between rods 44 to envelop sensor S. Rods 44 are arranged perpendicularly to each other thereby providing a cruciform configuration, which provides satisfactory protection for sensor S while allowing molten steel to immediately contact sensor S in order to provide a reading.

In preferred embodiments of the invention, each rod 44 is bent into a V-shape, as best shown in FIG. 1, and secured to the outer periphery of tube 34 by welding. The inherently strong crossed V-shape cage C provides protection for sensor S as assembly D penetrates the slag layer. Cage C also provides advantages over prior art cast leg designs, which are more easily broken. To increase the strength of cast legs, the cast legs must be relatively thick and heavy, thereby resulting in slower melting compared to the rods of the present invention, and inaccurate temperature readings because of the large mass of relatively cool metal surrounding the sensor during the period when the case is melting. The comparatively small mass rods 44 of cage C are not easily broken, and provide little cooling effect to the molten steel during the critical temperature reading. While protecting sensor S, the open design of cage C allows molten steel to quickly and completely surround and envelop sensor S to provide an accurate reading.

In preferred embodiments of the present invention, sensor S is a platinum/rhodium-platinum thermocouple. Sensor S may also be an oxygen sensor. The thermocouple sensor as shown in FIGS. 1 and 2 is an Electro-Nite 6/30. The Electro-Nite 6/30 is a thermocouple made from one platinum wire alloyed with 6% rhodium welded to a second wire which is an alloy of 30% rhodium and 70% platinum. This thermocouple is encased in a U-shaped quartz tube the ends of which are potted with a refractory cement in a ceramic case 46. The Electro-Nite 6/30 thermocouple is provided with sensor leads 26. Because of pipes 12 and 14, leads 26 have good thermal isolation during the measurement process. Similarly, the mass of weight W thermally isolates leads 26 and end portion 16, thereby providing a longer effective life while assuring that the temperature measured is that affecting the thermocouple. Sensor leads 26 are connected to a two-wire electrical cable, not shown, using crimp connectors. Lead solder may be used along with crimping, but is not necessary.

As best shown in FIG. 1, sensor S includes a case 46 comprising an essentially hollow essentially cylindrical-shaped first end portion 16, a centrally located thick washer-shaped ceramic flange portion, and a thimble-shaped second end portion 50. The thimble shaped end comprises a thin metal shield which surrounds the U-shaped quartz tube of the Electro-Nite 6/30 thermocouple, encasing the thermocouple and protecting its fragile quartz tube until shield 50 melts just after it contacts the liquid steel. End portion 16 fits inside pipe 14. Flange 48 provides a surface for securing sensor S to end 22 of pipe 14. Flange 48 also helps to keep molten steel from entering handle H and damaging the leads 26. Sensor S is held in place against end face 22 by a refractory cement, such as Sauereisen No. 29.

In use, drop-in sensor assembly D is typically dropped into a BOF through a chute used to charge the vessel with fluxes. Cage C hits and penetrates the slag layer. Cage C protects sensor S during its travel down the flux chute and also during the impact with the slag layer. The weight of assembly D would cause submersion of, at least, sensor S into the molten steel below the slag layer. Cage C, comprised of crossed steel rods 44 and having an open and low mass design, is quickly melted by the molten steel, thereby allowing sensor S to be engulfed by the molten steel. Case 46 of sensor S is also rapidly melted exposing the actual temperature or oxygen sensing element to the molten steel.

While this invention has been described as having a preferred design, it is understood that it is capable of further modifications, uses and/or adaptations of the invention, following the general principle of the invention and including such departures from the present disclosure has come within known or customary practice in the art to which the invention pertains, and as may be applied to the central features hereinbefore set forth, and fall within the scope of the invention of the limits of the appended claims.

I claim:

1. A drop-in sensor comprising:
    a) a handle having an end;
    b) a sensor secured to and extending from said end;
    c) a first sealing member secured to and surrounding said handle adjacent said end;
    d) a second sealing member secured to and surrounding said handle axially spaced from said first sealing member;
    e) a tube surrounding said handle and extending between and secured to said first and second sealing members and defining a receptacle;
    f) a high density material within said receptacle; and
    g) a cage secured to said tube and disposed about said sensor.

2. The drop-in sensor of claim 1, wherein said high density material has a bulk density of at least 1.2 times the density of liquid steel.

3. The drop-in sensor of claim 1, wherein said high density material is one of lead and copper.

4. The drop-in sensor of claim 1, wherein said handle includes first and second pipes, said first pipe secured within said second pipe to minimize void space between said first second pipes.

5. The drop-in sensor of claim 1, wherein said receptacle is vented.

6. The drop-in sensor of claim 5, wherein at least a first vent is disposed between said handle and said second sealing member.

7. The drop-in sensor of claim 1, wherein said sensor is one of an oxygen sensor and a temperature sensor.

8. The drop-in sensor of claim 1, wherein said sensor includes a flange secured to said end and closing said handle.

9. The drop-in sensor of claim 8, wherein a cementitious material secures said flange to said end.

10. The drop-in sensor of claim 1, wherein said cage is comprised of first and second mutually perpendicular rods.

11. The drop-in sensor of claim 10, wherein said first and second rods extend in a V-shape from said handle.

12. A drop-in sensor, comprising:
 a) a first pipe having an end;
 b) a sensor secured to and extending from said end;
 c) a second pipe secured within said first pipe and terminating short of said end;
 d) a first sealing member surrounding and secured to said first pipe adjacent said end;
 e) a second sealing member surrounding and secured to said first pipe axially spaced from said first sealing member;
 f) a tube surrounding said first pipe and extending between and sealed to said first and second sealing members and defining a receptacle;
 g) a material having a density of at least 1.2 times the density of liquid steel disposed within said receptacle; and
 h) a cage secured to said tube and disposed about said sensor.

13. The drop-in sensor of claim 12, wherein said material is one of lead and copper.

14. The drop-in sensor of claim 12, wherein said receptacle is vented.

15. The drop-in sensor of claim 14, wherein said first member has a liquid tight seal with said first pipe and said tube, and said second member having a vented seal with said first pipe.

16. The drop-in sensor of claim 12, wherein said sensor is one of an oxygen sensor and a temperature sensor.

17. The drop-in sensor of claim 12, wherein said sensor includes a flange cementitiously secured to said end.

18. The drop-in sensor of claim 12, wherein said cage is comprised of first and second mutually perpendicular rods.

19. The drop-in sensor of claim 18, wherein said first and second rods are V-shaped.

* * * * *